(12) United States Patent
Wang et al.

(10) Patent No.: US 12,490,707 B1
(45) Date of Patent: Dec. 9, 2025

(54) HOLDING DEVICES FOR CAT LITTER AND WASTE AND USAGE METHODS

(71) Applicant: TIANJIN CHENGYU TECHNOLOGY CO., LTD., Tianjin (CN)

(72) Inventors: Ruize Wang, Tianjin (CN); Cunhong Lai, Tianjin (CN)

(73) Assignee: TIANJIN CHENGYU TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 19/096,711

(22) Filed: Mar. 31, 2025

(30) Foreign Application Priority Data

Jan. 14, 2025 (CN) .......................... 202520086457.2
Feb. 17, 2025 (CN) .......................... 202510174413.X

(51) Int. Cl.
*A01K 1/01* (2006.01)

(52) U.S. Cl.
CPC .................................... *A01K 1/011* (2013.01)

(58) Field of Classification Search
CPC .............................. A01K 1/011; A01K 1/0114
See application file for complete search history.

(56) References Cited

U.S. PATENT DOCUMENTS

| | | | |
|---|---|---|---|
| D272,198 S | 1/1984 | Webb et al. | |
| 4,505,226 A | 3/1985 | Carlson | |
| 5,167,204 A * | 12/1992 | Nussle | A01K 1/0114 209/634 |
| 5,193,488 A * | 3/1993 | Walton | A01K 1/0107 119/169 |
| D351,693 S | 10/1994 | Sutton | |
| 5,544,620 A * | 8/1996 | Sarkissian | A01K 1/0114 119/166 |
| 5,785,000 A * | 7/1998 | Barbary | A01K 1/0114 119/166 |
| 6,701,868 B1 * | 3/2004 | Shepherd | A01K 1/0114 119/168 |
| D527,498 S | 8/2006 | Lewis, II | |

(Continued)

FOREIGN PATENT DOCUMENTS

| | | |
|---|---|---|
| CN | 212014002 U | 11/2020 |
| CN | 306725076 S | 7/2021 |

(Continued)

OTHER PUBLICATIONS

English translation of description CN 113854160 A (Year: 2021).*

(Continued)

*Primary Examiner* — David J Parsley
*Assistant Examiner* — Danielle A Clerkley
(74) *Attorney, Agent, or Firm* — PORUS IP LLC

(57) ABSTRACT

The present disclosure relates to a holding device for cat litter and waste and a usage method, the holding device for cat litter and waste including a bottom box-like structure, wherein an upper end of the bottom box-like structure is provided with a holding bag, a holding box for cat litter and waste is provided above the holding bag, the holding box for cat litter and waste includes a bottom box and a waste cover, an interior of the bottom box is provided with a partition, and an odor-resistant baffle is provided on all side walls of the waste cover.

14 Claims, 10 Drawing Sheets

(56) References Cited

U.S. PATENT DOCUMENTS

| | | | | |
|---|---|---|---|---|
| 7,207,292 B1* | 4/2007 | Colten | ............... | A01K 1/0114 D30/162 |
| 8,109,237 B1* | 2/2012 | Tsengas | ............... | A01K 1/0114 119/616 |
| D686,786 S | 7/2013 | Alami | | |
| 8,567,348 B2 | 10/2013 | Cook et al. | | |
| D782,756 S | 3/2017 | Veness et al. | | |
| D786,514 S | 5/2017 | Stricklin et al. | | |
| D899,015 S | 10/2020 | Rossi | | |
| 11,129,356 B2* | 9/2021 | Klatt | ............... | A01K 1/0114 |
| D989,418 S | 6/2023 | Li | | |
| D1,050,638 S | 11/2024 | Wang et al. | | |
| D1,064,455 S | 2/2025 | Goldfinger et al. | | |
| 2003/0217700 A1* | 11/2003 | Northrop | ............... | A01K 1/0114 119/166 |
| 2006/0169214 A1* | 8/2006 | Turkalo | ............... | A01K 1/011 119/165 |
| 2006/0196439 A1* | 9/2006 | Chilcoat | ............... | A01K 1/0114 119/165 |
| 2007/0039556 A1* | 2/2007 | Cook | ............... | A01K 1/0114 119/166 |
| 2010/0043717 A1* | 2/2010 | Walker | ............... | A01K 1/0114 119/167 |
| 2011/0017142 A1* | 1/2011 | Tsengas | ............... | A01K 1/0114 119/166 |
| 2018/0110199 A1* | 4/2018 | Venezio | ............... | A01K 1/0125 |
| 2018/0192610 A1 | 7/2018 | Petty et al. | | |
| 2020/0267928 A1* | 8/2020 | Rossi | ............... | A01K 1/0114 |
| 2022/0159924 A1* | 5/2022 | Krieser | ............... | A01K 1/011 |
| 2023/0232782 A1 | 7/2023 | Brush | | |
| 2024/0381832 A1* | 11/2024 | Deng | ............... | A01K 1/0114 |

FOREIGN PATENT DOCUMENTS

| | | | | |
|---|---|---|---|---|
| CN | 113854160 A | * | 12/2021 | ......... A01K 1/0107 |
| CN | 308954856 S | | 11/2024 | |
| EM | 0150697890001 S | | 8/2024 | |

OTHER PUBLICATIONS

"COSPARX Stainless Steel Reusable Litter Tray", Web page <https://www.amazon.com/dp/B0CDZCJ24G?th=1>, May 22, 2023.

"HUAXIAO Cat Litter Box", Web page <https://www.amazon.com/Cleaning-Reusable-Automatic-Supplies-Pellets/dp/B09YCK8RGZ?th=1>, Apr. 19, 2022.

* cited by examiner

HOLDING DEVICES FOR CAT LITTER AND WASTE AND USAGE METHODS

CROSS-REFERENCE TO RELATED APPLICATIONS

This application claims priority of Chinese Patent Application No. 202520086457.2, filed on Jan. 14, 2025 and Chinese Patent Application No. 202510174413.X, filed on Feb. 17, 2025. The entire contents of each of which are incorporated herein by reference.

TECHNICAL FIELD

The present disclosure generally relates to the technical field of cat litter boxes, and in particular, to a holding device for cat litter and waste and a usage method.

BACKGROUND

Currently, there are two types of holding devices for cat litter and waste used in conjunction with an auto-cleaning litter box. The first type is constructed from plastic or metal materials, with only a holding box and without a waste cover, which is a recycled product. After use, the user carries the holding box full of cat excrement and cat litter with both hands and dumps the cat excrement and the used cat litter into a garbage bin. Afterward, the user manually washes and cleans the interior of the holding box, which is full of dirt, and then fills it with new cat litter for continued use. The second type is made from laminated or film-coated cardboard, and includes a holding box, a waste cover, and a top cover, which is a one-time disposable product. After use, the user flips the top cover, which is initially placed at the bottom of the holding box, over the top to seal the holding box which filled with cat excrement and used cat litter. The user then carries the sealed box with both hands to the garbage bin for disposal and then replace it with a set of a new holding device for cat litter for continued use.

But the above two types of holding device for cat litter and wastes have the following flaws and shortcomings.

Both types of the holding devices for cat litter and wastes require users to handle and dispose of the soiled holding box with both hands after use. Because of the two-handed operation, the mouth and the nose of the user are closer to cat excrement and the used cat litter, forcing them to endure the unpleasant odor throughout the process. Additionally, since both hands are occupied by the holding box, it is inconvenient to open the lid of the garbage bin directly with the hands when discarding.

As for the second type of the holding device for cat litter and waste with laminated or film-coated cardboard surfaces, the holding box, waste cover, and top cover are all disposable, resulting in higher usage costs that many users find unacceptable.

Therefore, there is a need to provide a holding device for cat litter and waste that is easy to use and has a low cost of use and a usage method of the holding device for cat litter and waste.

SUMMARY

One or more embodiments of the present disclosure provide a holding device for cat litter and waste, including a bottom box-like structure, wherein an upper end of the bottom box-like structure is provided with a holding bag, a holding box for cat litter and waste is provided above the holding bag, the holding box for cat litter and waste includes a bottom box and a waste cover, an interior of the bottom box is provided with a partition, and an odor-resistant baffle is provided on a side wall of the waste cover.

In some embodiments, the holding bag includes a drawstring plastic bag; the bottom of the holding bag is a sealing structure, and a drawstring is provided at the upper end of the holding bag.

In some embodiments, the partition separates the bottom box into a cat litter storage area and an excrement storage area.

In some embodiments, the odor-resistant baffle and the waste cover are of an integrally molded design, and the waste cover is provided with a positioning structure.

In some embodiments, the positioning structure includes at least one galvanized iron sheet.

In some embodiments, the bottom box-like structure is of an integrally molded design, and the bottom of the bottom box-like structure is provided with a concave-convex structure.

In some embodiments, the bottom box-like structure is provided with air vents.

In some embodiments, a middle of the waste cover is a raised structure.

In some embodiments, inner and outer corners of the bottom box are rounded.

In some embodiments, a cavity is disposed inside the waste cover, and an interior of the cavity is configured to hold a deodorizing material.

In some embodiments, the bottom box-like structure includes a first curved edge and a concave slot; the first curved edge is set on a top of the bottom box-like structure; and the concave slot is provided on at least one outer side face of the first curved edge.

In some embodiments, at least one of the holding box for cat litter and waste or the waste cover is provided with a structure matched with the concave slot.

In some embodiments, the holding device for cat litter and waste further includes an automatic bag collecting device; wherein the automatic bag collecting device includes a driving structure, a hook, and a fixing structure; the fixing structure is provided on the bottom box-like structure, and the fixing structure is configured to fix a drawstring; and the driving structure is configured to drive the hook to move or rotate to hook the drawstring.

In some embodiments, the holding device for cat litter and waste further includes a processor; wherein the processor is configured to: obtain a model number of the holding bag; determine a moving speed and a moving distance of the hook based on the model number of the holding bag; and in response to a weight of waste reaching a predetermined packing weight, control the automatic bag collecting device to automatically pack the waste based on the moving speed and the moving distance, and send a packing completion reminder to a user after packaging is completed.

In some embodiments, at least one ear is provided at an outer edge of the holding box for cat litter and waste.

One or more embodiments of the present provide a usage method of a holding device for cat litter and waste, including: setting a holding bag on a bottom box-like structure; placing a holding box for cat litter and waste in the holding bag; spreading cat litter in a cat litter storage area of the holding box for cat litter and waste; mounting an auto-cleaning litter box on the holding box for cat litter and waste; after use, removing the auto-cleaning litter box, lifting the holding bag, the holding bag carrying the holding box for cat litter and waste disengaging from the bottom box-like structure, discarding the holding bag, the holding box for cat litter and waste, and used cat litter and cat excrement in the holding box for cat litter and waste; and reinstalling a new holding bag and a new holding box for cat litter and waste on the bottom box-like structure, and spreading with new cat litter, and reinstalling the auto-cleaning litter box.

One or more embodiments of the present provide a usage method of a holding device for cat litter and waste, including: placing a holding bag under a holding box for cat litter and waste; spreading cat litter in a cat litter storage area of the holding box for cat litter and waste; mounting an auto-cleaning litter box on the holding box for cat litter and waste; after use, removing the auto-cleaning litter box, lifting the holding bag, the holding bag carrying the holding box for cat litter and waste, discarding the holding bag, the holding box for cat litter and waste, and used cat litter and cat excrement in the holding box for cat litter and waste; reinserting a set of a new holding bag and a new holding box for cat litter and waste, spreading new cat litter, and reinstalling the auto-cleaning litter box; or placing a holding box for cat litter and waste on a floor or a platform; spreading cat litter in a cat litter storage area of the holding box for cat litter and waste; mounting an auto-cleaning litter box on the holding box for cat litter and waste; after use, removing the auto-cleaning litter box, discarding used cat litter and cat excrement inside, and cleaning or replacing the holding box for cat litter and waste; and respreading the cat litter storage area with new cat litter and reinstalling the auto-cleaning litter box for continued use.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
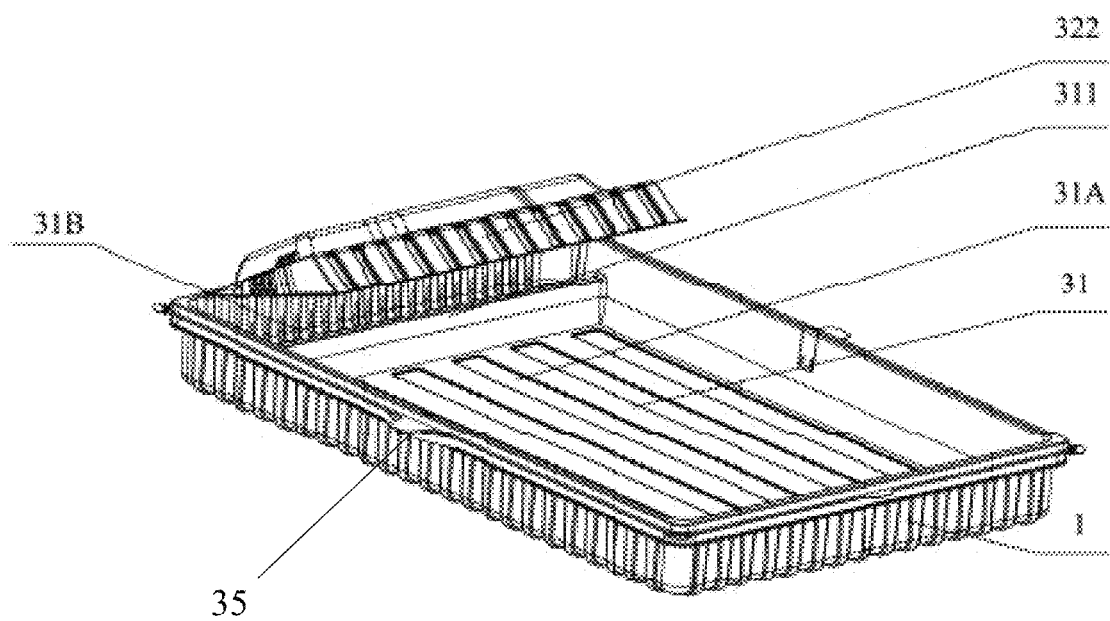
FIG. 1 is a schematic diagram of a structure of a holding device for cat litter and waste with a reusable bottom box-like structure according to some embodiments of the present disclosure.

In order to more clearly illustrate the technical solutions of the embodiments of the present, the following briefly describe the accompanying drawings that need to be used in the description of the embodiments. Obviously, the accompanying drawings in the following description are only some examples or embodiments of the present, and it is possible for a person of ordinary skill in the art to apply the present to other similar scenarios in accordance with the accompanying drawings, without creative labor. Unless obviously obtained from the context or the context illustrates otherwise, the same numeral in the drawings refers to the same structure or operation.

Figure 2:
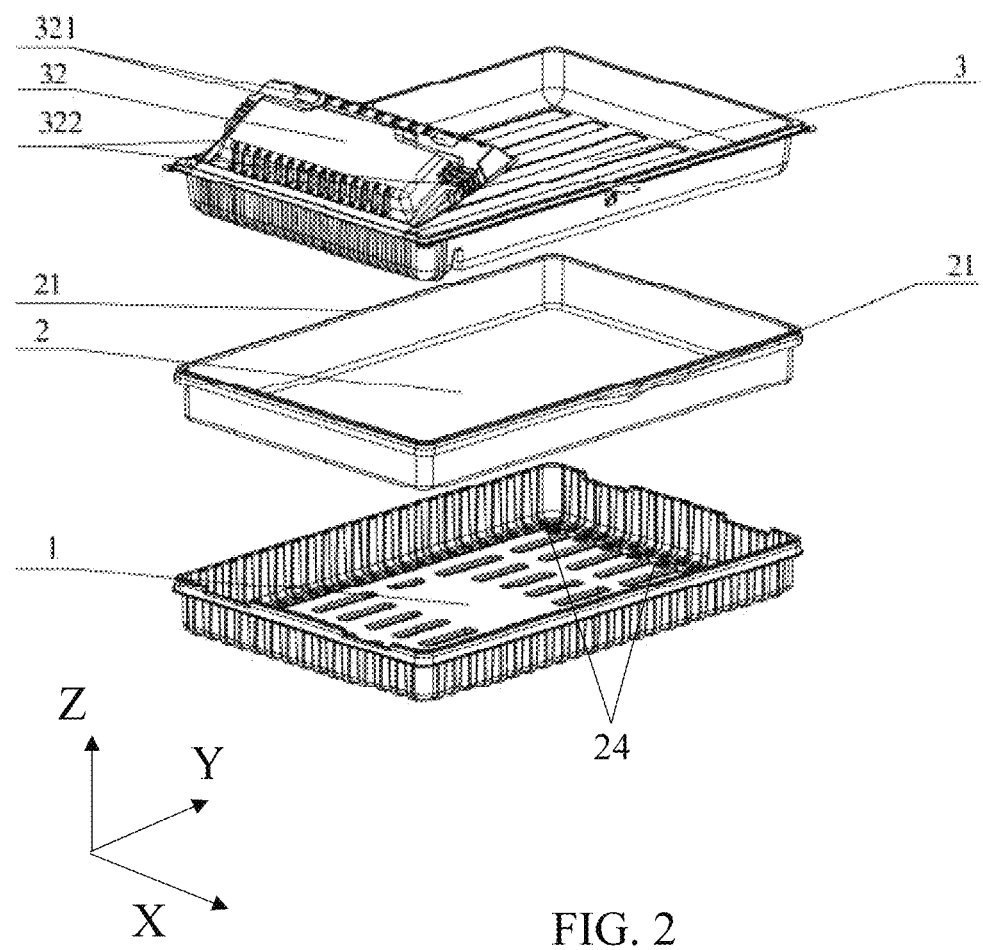
FIG. 2 is an exploded schematic diagram of a holding device for cat litter and waste with a reusable bottom box-like structure according to some embodiments of the present disclosure.
Figure 3:
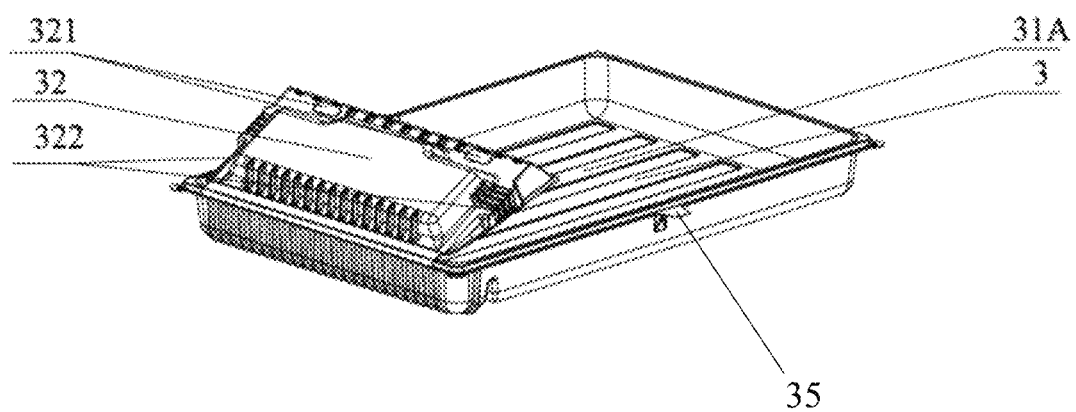
FIG. 3 is a schematic diagram of a structure of a holding device for cat litter and waste according to some embodiments of the present disclosure.
Figure 4:
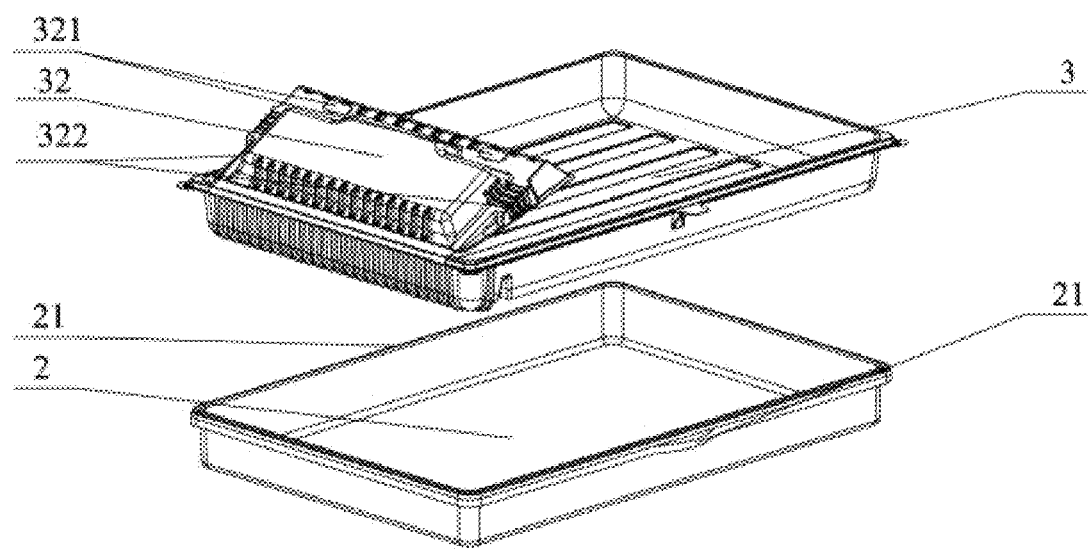
FIG. 4 is a schematic diagram of structures of a holding bag and a holding device for cat litter and waste according to some embodiments of the present disclosure.

FIG. 1 is a schematic diagram of a structure of a holding device for cat litter and waste with a reusable bottom box-like structure according to some embodiments of the present disclosure. FIG. 2 is an exploded schematic diagram of a holding device for cat litter and waste with a reusable bottom box-like structure according to some embodiments of the present disclosure. FIG. 3 is a schematic diagram of a structure of a holding device for cat litter and waste according to some embodiments of the present disclosure. FIG. 4 is a schematic diagram of structures of a holding bag and a holding device for cat litter and waste according to some embodiments of the present disclosure.

As shown in FIG. 1-FIG. 4, the holding device for cat litter and waste includes a bottom box-like structure 1, wherein an upper end of the bottom box-like structure 1 is provided with a holding bag 2, a holding box 3 for cat litter and waste (also referred as to a holding box 3) is provided above the holding bag 2, the holding box 3 for cat litter and waste includes a bottom box 31 and a waste cover 32, an interior of the bottom box 31 is provided with a partition 311, and an odor-resistant baffle 322 is provided on all side walls of the waste cover 32.

The bottom box-like structure 1 refers to an open box-like structure with a holding space capable of serving as a mounting base. In some embodiments, the bottom box-like structure 1 is provided with a holding pocket 2 above the bottom box-like structure 1. In some embodiments, at least a portion of the holding bag 2 is provided within a holding space of the bottom box-like structure 1. In some embodiments, the holding bag 2 includes a drawstring plastic bag.

The holding box 3 for cat litter and waste refers to an open box-like structure with a holding space. In some embodiments, the holding box 3 for cat litter and waste is provided above the holding bag 2. In some embodiments, the holding box 3 for cat litter and waste can be spread with cat litter. User may put an auto-cleaning litter box on the top of the holding box 3 for cat litter and waste.

In some embodiments, at least a portion of the bottom of the holding box 3 for cat litter and waste is disposed within the holding space of the bottom box-like structure 1. In some embodiments, at least a portion of the bottom of the holding box 3 for cat litter and waste is disposed within the holding space of the holding bag 2.

The bottom box 31 is box-shaped.

The waste cover 32 refers to a structure for covering waste, for example, for covering cat excrement or the like. In some embodiments, the waste cover 32 is disposed on top of the bottom box 31 and the waste cover 32 partially covers the bottom box 31. In some embodiments, a portion of the bottom box 31 that is covered by the waste cover 32 forms an excrement storage area 31B, and a portion of the bottom box 31 that is not covered by the waste cover 32 forms a cat litter storage area 31A. In some embodiments, the cat litter storage area 31A is used for spreading the cat litter. The user puts the auto-cleaning litter box on top of the holding box 3 for cat litter and waste before using. The auto-cleaning litter box cleans the waste from the cat litter storage area 31A to the excrement storage area 31B during using.

In some embodiments, the waste cover 32 is attached to an inner side wall of the bottom box 31 along a width direction (e.g., the X direction in FIG. 2). In this way, the area occupied by the excrement storage area 31B in the width direction (e.g., the X direction in FIG. 2) is reduced, which facilitates the reduction of unused cat litter that is cleared into the excrement storage area 31B during cleaning of the auto-cleaning litter box, thereby avoiding unnecessary waste.

The odor-resistant baffle 322 is used to block odors emanating from cat excrement. In some embodiments, the odor-resistant baffle 322 is used to block odors emanating from cat excrement by adsorption. In some embodiments, a cavity is disposed inside the waste cover 32, and an interior of the cavity is configured to hold a deodorizing material. For example, the deodorizing material is activated carbon. The cavity is disposed on the waste cover 32 in a plurality of ways, for example, at least one of machining, one-piece molding, bonding, gluing, snap-fitting, etc.

In some embodiments, the waste cover 32 includes a porous plate-like structure to facilitate odor absorption. For example, the porous plate-like structure may be at least one of a porous sponge plate, a porous plastic plate, or the like. In some embodiments, the odor-resistant baffle 322 is of an integrally molded structure with the waste cover 32. In some embodiments, the odor-resistant baffle 322 is also removably connected (e.g., snap-fitting, connecting via screws, etc.) to the waste cover 32, allowing the odor-resistant baffle 322 to be replaced.

In some embodiments, the odor-resistant baffle 322 is connected to the waste cover 32 in the plurality of ways. For example, the odor-resistant baffle 322 is connected to the waste cover 32 by at least one of bonding, snap-fitting, integrally molded, or the like.

In some embodiments, a middle of the waste cover 32 is a raised structure, thereby providing more space for the excrement storage area 31B.

The end of the waste cover 32 is the end of the waste cover 32 proximate the cat litter storage area 31A. In some embodiments, the waste cover 32, the odor-resistant baffle 322, and the side wall of the bottom box 31 form the excrement storage area 31B. In some embodiments, the odor-resistant baffle 322 isolates the cat litter storage area 31A from the excrement storage area 31B. In some embodiments, the ends of the waste cover 32 also include two ends of the waste cover 32 along a width direction (e.g., the X direction in FIG. 2).

In some embodiments, the waste cover 32 may be open or closes. When the waste cover 32 is open, the auto-cleaning litter box cleans the excrement and other waste into the excrement storage area 31B covered by the waste cover 32. When the waste cover 32 is closed, the odor-resistant baffle 322 segregates the excrement storage area 31B from the cat litter storage area 31A.

In some embodiments, the waste cover 32 is in an integral structure with the bottom box 31.

The integral structure means that the waste cover 32 and the bottom box 31 are machined and molded at the same time as a whole.

In some embodiments, the waste cover 32 and the bottom box 31 are of a split assembly structure.

The split assembly structure means that the waste cover 32 and the bottom box 31 are manufactured and molded separately, and then combined.

In some embodiments, the waste cover 32 and the bottom box 31 are made of thermoforming material. The waste cover 32 and the bottom box 31 are processed using a thermoforming process. The thermoforming material includes at least one of PVC, PET, PP, or the like. In some embodiments, the waste cover 32 and the bottom box 31 are made of other materials, for example, disposable materials or the like. The disposable material includes at least one of paper, degradable plastic, or the like.

In some embodiments, a bottom of the holding bag 2 is a sealing structure, and drawstrings 21 are provided at both sides of top of the holding bag 2, and the holding bag 2 is placed under the holding box 3 for cat litter and waste. By using the holding bag 2, the holding box 3 for cat litter and waste, the cat litter, and the cat excrement can be lifted after use together, without the need to hold the holding box 3 for cat litter and waste with both hands, improving the user experience.

The drawstring 21 refers to a cord-like structure provided in the holding bag 2. In some embodiments, each end of the drawstring 21 is connected to the holding bag 2, and the user is able to lift and pull the drawstring 21 to drive the holding bag 2 to move. In some embodiments, two drawstrings 21 are provided on the outer side wall of the holding bag 2. The two drawstrings 21 are provided on opposite sides of the holding bag 2, and the user is able to lift the two drawstrings 21 with one hand simultaneously, thereby causing the holding bag 2 to fold from the middle, which is helpful for locking in waste and odor and preventing spillage of waste. By providing the drawstrings 21, it is able to make waste packing and discarding of waste more convenient.

In some embodiments, the waste cover 32 is rotatably connected to the bottom box 31.

In some embodiments, the waste cover 32 and the bottom box 31 are in an integral structure, and the waste cover 32 and the bottom box 31 are made of thermoforming material, so that the connection between the waste cover 32 and the bottom box 31 has a certain degree of flexibility, and the waste cover 32 and the bottom box 31 rotate with the connection as a center of rotation.

By making the waste cover pivotally connected to the bottom box 31, it is possible to easily open or close the waste cover 32.

In some embodiments, the holding device for cat litter and waste is a reusable type.

For example, the user installs the holding bag 2 in the holding space of the bottom box-like structure 1, and then installs the holding box 3 for cat litter and waste in the holding bag 2. The user spreads the cat litter in the cat litter storage area 31A of the holding box 3, and then mounts the auto-cleaning litter box on the holding box 3. During use, the auto-cleaning litter box opens the waste cover 32 and cleans excrement and other waste into the excrement storage area 31B at the bottom of the waste cover 32, and then closes the waste cover 32 to reduce odor emissions. After use, the user stands the auto-cleaning litter box upright, lifts the drawstrings 21 on both sides of the holding bag 2 with both hands, and lifts up the holding bag 2, the holding box 3 for cat litter and waste, and the used cat litter and excrement from the interior together, handing them over to one hand for disposal. After that, a new holding bag 2 and the holding box 3 for cat litter and waste are placed on the bottom box-like structure 1, the holding box 3 for cat litter and waste is spread with new cat litter in the cat litter storage area 31A, and the auto-cleaning litter box is mounted on the holding box 3 for cat litter and waste for continued use.

Some embodiments of the present disclosure provide the holding device for cat litter and waste. When a reusable type is used, the bottom box-like structure is reusable, the holding bag 2 and the holding box 3 for cat litter and waste are disposable. The bottom of the holding box 3 for cat litter and waste has both a cat scratching breakage preventing function and a leak-proof function, and the bottom of the holding bag 2 is the sealing structure, which plays a secondary anti-leakage function. A concave portion of the bottom box-like structure 1 is the sealing structure, which plays a triple anti-leakage function. The disposal process only requires carrying the drawstrings, so cat excrement and the used cat litter are kept far from the mouth and nose, avoiding any unpleasant odors during operation. At the same time, since the disposal process only requires one-handed operation, the user can open the lid of the litter box with the other hand, which greatly improves operational convenience. Moreover, since the customer only needs to dispose of the holding bag, the disposable cat litter, and the holding box for cat litter and waste after each use, it reduces the cost of use for the user. Additionally, the waste cover conceals cat excrement during use. Not only does it mask the odor, but it also prevents cat excrement from dirtying the interior of the auto-cleaning litter box.

In some embodiments, the holding device for cat litter and waste is a disposable type.

For example, a first disposable type involves using the holding bag 2 in combination with the holding box 3 for cat litter and waste. First, the holding bag 2 is placed under the holding box 3 for cat litter and waste, the cat litter is spread in the cat litter storage area 31A of the holding box 3 for cat litter and waste, and then the auto-cleaning litter box is mounted on the holding box 3 for cat litter and waste, making it ready for use. After use, the user stands the auto-cleaning litter box upright, lifts the drawstrings 21 on both sides of the holding bag 2 with both hands, and lifts the holding bag 2, the holding box 3 for cat litter and waste, and the used cat litter and excrement together, handing them over to one hand for disposal. After that, a set of a new holding bag 2 and a new holding box 3 for cat litter and waste is placed, new cat litter is spread in the cat litter storage area 31A of the holding box 3 for cat litter and waste, and then the auto-cleaning litter box is mounted on the holding box 3 for cat litter and waste for continued use.

For example, a second disposable type involves using the holding box 3 for cat litter and waste independently. The cat litter is spread in the cat litter storage area 31A of the holding box 3 for cat litter and waste, and then the auto-cleaning litter box is mounted to the holding box for cat litter and waste, making it ready for use. After use, the user stands the auto-cleaning litter box upright, and the holding box 3 for cat litter and waste is held to empty the used cat litter and excrement into a garbage bag or bin, followed by manual cleaning of the interior of the holding box 3 for cat litter and waste, after which new cat litter is spread for continued use. In some embodiments, the used cat litter and excrement are discarded with the holding box 3 for cat litter and waste, a new holding box 3 for cat litter and waste is mounted and new cat litter is spread for continued use.

For customers seeking the utmost in cost efficiency, the holding device for cat litter and waste offers a recycled type use program. The holding device for cat litter and waste is cleaned with water for recycled functionality. The waste cover has a disassembly structure, so that when the waste cover becomes dirty, the customer can choose to remove the waste cover for individual cleaning or directly replace it with a new waste cover. This provides customers with a plurality of independent choices.

In some embodiments, the partition 311 separates the bottom box 31 into the cat litter storage area 31A and the excrement storage area 31B, and it is convenient to separate the cat litter and excreta by providing the partition 311 to divide the bottom box 31 into the cat litter storage area 31A and the excrement storage area 31B.

The partition 311 is used to separate the cat litter storage area 31A and the excrement storage area 31B. In some embodiments, the partition 311 is connected to the bottom box 31 in the plurality of ways, for example, at least one of bonding, gluing, snap-fitting, one-piece molding, or the like.

In some embodiments, the odor-resistant baffle 322 and the waste cover 32 are of an integrally molded design, and the waste cover 32 is provided with a positioning structure 321.

The positioning structure 321 refers to a structure for positioning the auto-cleaning litter box. By providing the positioning structure 321, the positioning efficiency and positioning accuracy of the auto-cleaning litter box is improved when installing the auto-cleaning litter box, thereby facilitating rapid installation of the auto-cleaning litter box.

In some embodiments, the positioning structure 321 includes at least one galvanized iron sheet. The auto-cleaning litter box is used in conjunction with the at least one galvanized iron sheet. For example, the auto-cleaning litter box is provided with at least one magnet, and the positioning function is achieved by adsorbing the galvanized iron sheet by the magnet. The magnet is provided in correspondence with the galvanized iron sheet.

In some embodiments, two galvanized iron sheets are provided, with the two galvanized iron sheets being symmetrically provided on opposite sides of the waste cover 32. In some embodiments, the galvanized iron sheets may have other counts, for example, one, three, or more.

The odor-resistant baffle 322 is provided above the cat litter excrement storage area 31B, which is able to provide a certain anti-odor effect.

In some embodiments, the bottom box-like structure 1 is of an integrally molded design, and a bottom of the bottom box-like structure 1 is provided with a concave-convex structure, and the concave-convex structure is used to strengthen the support and increase the strength as well as the load-bearing capacity of the bottom box-like structure 1.

The concave-convex structure includes at least one concave portion and at least one convex portion, the at least one concave portion being interleaved with the at least one convex portion. In some embodiments, the concave portion and the convex portion extend along the length of the bottom box-like structure 1 (in the Y direction as shown in FIG. 2). The concave portion serves to collect urine and prevent leakage, and the convex portion serves as a support.

In some embodiments, the bottom box-like structure 1 is provided with air vents 24.

The air vents 24 are used to connect the interior of the bottom box-like structure 1 to the outside. When the holding bag 2 is loaded into the bottom box-like structure 1, the air between the holding bag 2 and the bottom box-like structure 1 is discharged outward through the air vents 24 to avoid a gradual increase of the air pressure between the holding bag 2 and the bottom box-like structure 1 with the loading of the holding bag 2, ensuring a smooth insertion of the holding bag 2 and the holding box 3 for cat litter and waste. When it is necessary to take out the holding bag 2, with the removal of the holding bag 2, outside air enters into the interior of the bottom box-like structure 1 through the air vents 24 to prevent negative pressure between the holding bag 2 and the bottom box-like structure 1, which affects the removal of the holding bag 2. In some embodiments, the bottom box-like structure 1 is reusable type.

In some embodiments, inner and outer corners of the bottom box 31 are rounded corners, preventing possible dangers brought about by sharp corners and improving the experience.

In some embodiments, at least one ear 35 is provided at an outer edge of the holding box 3 for cat litter and waste, as shown in FIG. 1.

The ear 35 extends outward along the outer side of the holding box 3, and there is an angle between the ear 35 and the side of the holding box 3. In some embodiments, the upper surface of the ear 35 is located in the same plane or in a different plane than the upper surface of the holding box 3. In some embodiments, the ear 35 is connected to the holding box 3 in the plurality of ways, for example, bonding, one-piece molding, or the like. In some embodiments, the ears 35 are provided on two side of the holding box 3 along the width direction (e.g., the X direction in FIG. 2). In some embodiments, the ear 35 is disposed at other locations on the holding box 3, depending on the actual needs. In some embodiments, the corners of the ear 35 have rounded transitions.

By providing the ear 35, when the holding box 3 is folded, the folding place of the holding box 3 corresponds to the location of the ear 35, and the ear 35 and the holding box 3 are folded at the same time, avoiding that sharp corners are formed on the side walls of the holding box 3 due to folding, and preventing sharp corners from piercing the holding bag.

Figure 5:
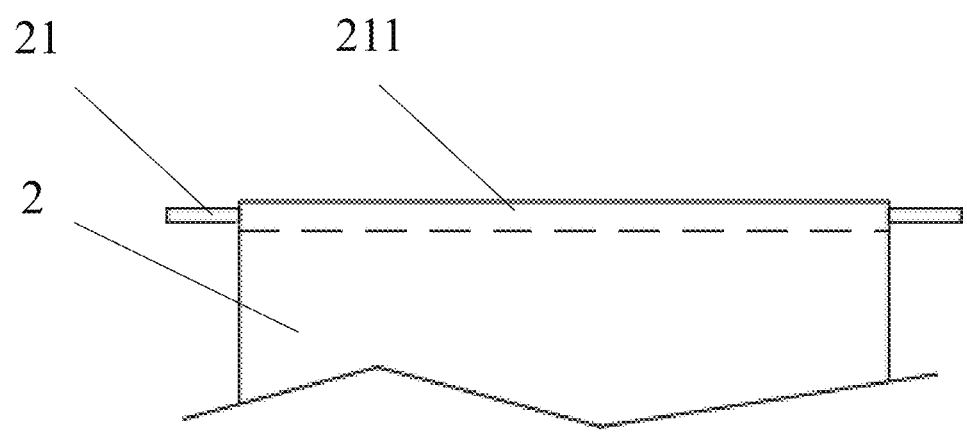
FIG. 5 is a schematic diagram of a structure of a holding bag according to some embodiments of the present disclosure.

FIG. 5 is a schematic diagram of a structure of a holding bag according to some embodiments of the present disclosure.

In some embodiments, the holding bag 2 is a drawstring holding bag, as shown in FIG. 5, and the opening of the holding bag 2 is provided with an annular channel 211 disposed along a circumferential direction, and at least a portion of the drawstring 21 is disposed within the annular channel 211. In some embodiments, the drawstrings 21 are connected in a loop, with the looped drawstrings 21 being provided within the annular channel 211. In some embodiments, the annular channel 211 is provided with at least one opening, and at least a portion of the drawstring 21 protrudes out of the annular channel 211 through the at least one opening. The user lifts and pulls on the portion of the drawstring 21 protruding out of the annular channel 211 to bring the at least one opening of the holding bag 2 centrally together, which in turn tightens the openings of the holding bag 2.

Figure 6:
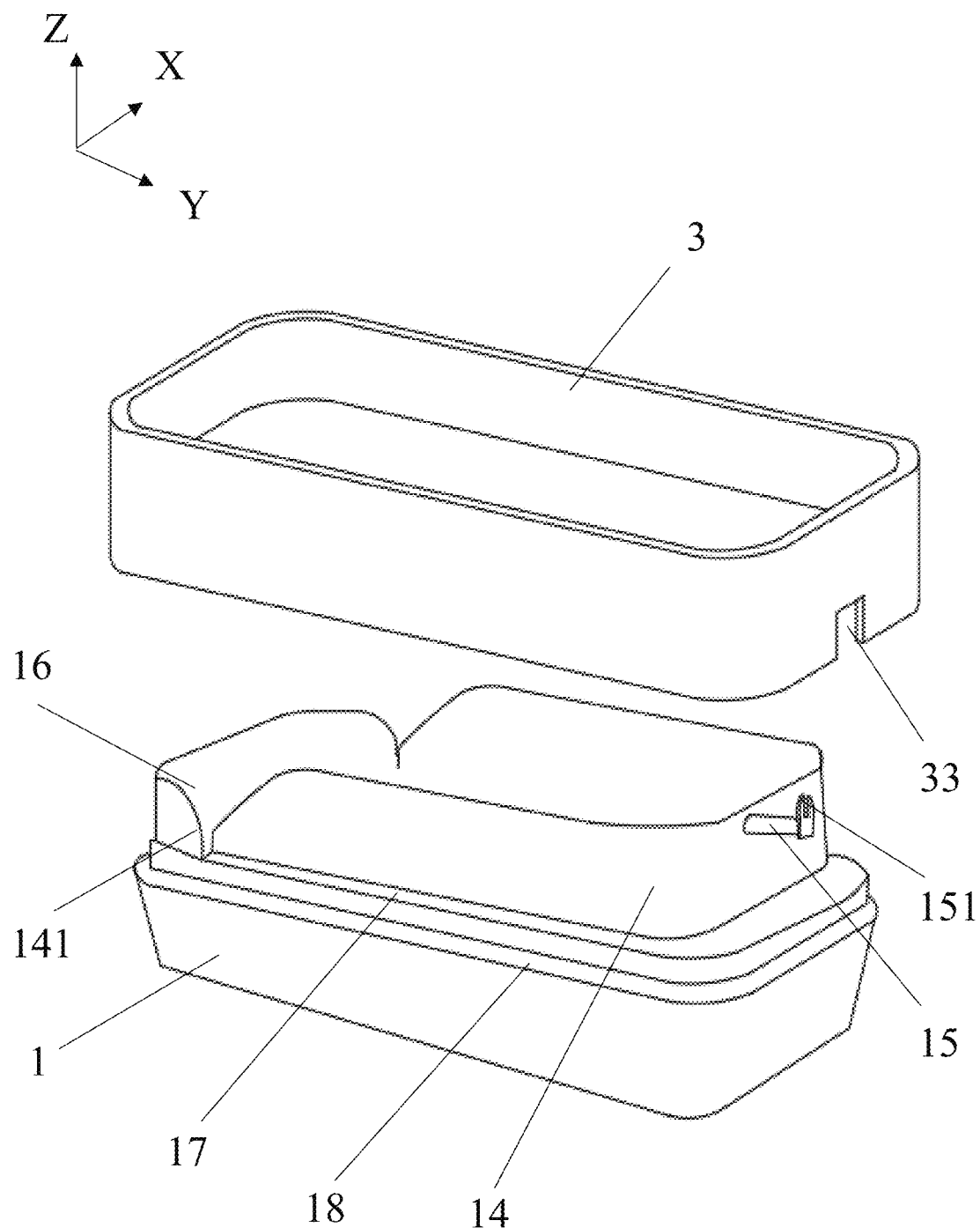
FIG. 6 is a schematic diagram of a structure of a bottom box-like structure according to some embodiments of the present disclosure.

FIG. 6 is a schematic diagram of a structure of a bottom box-like structure according to some embodiments of the present disclosure.

In some embodiments, the bottom box-like structure 1 includes a first curved edge 14 and a concave slot 15.

The first curved edge 14 refers to a structure that projects upward in a vertical direction (e.g., the Z direction in FIG. 6) relative to the upper surface of the bottom box-like structure 1. In some embodiments, the first curved edge 14 is in a plate-like structure. In some embodiments, the first curved edge 14 is set on a top of the bottom box-like structure 1, and the first curved edge 14 is provided along a circumferential direction of the top of the bottom box-like structure 1. In some embodiments, at least a portion of the opening of the holding bag 2 sleeves the first curved edge 14 after the holding bag 2 is set within the holding space, which enables the holding bag 2 to be secured using the first curved edge 14.

The concave slot 15 refers to a structure that protrudes outward with respect to the outer surface of the first curved edge 14. In some embodiments, the concave slot 15 is provided on at least one of one outer side face of the first curved edge 14. In some embodiments, the concave slot 15 is provided with a first groove 1151. At least a portion of the drawstring 21 is snapped to the first groove 1151. In some embodiments, a portion of the drawstring 21 protruding from the opening of the annular channel 211 is snapped to the first groove 1151. Using the first groove 1151 to snap-fit the drawstring 21 secures the drawstring 21, thereby facilitating user use.

By providing the first curved edge, a drawstring holding bag (e.g., a drawstring garbage bag, etc.) commonly available on the market is set on the first curved edge, thereby facilitating packing of the holding bag together with the holding box. Moreover, it is convenient to sleeve drawstring holding bag quickly on the first curved edge, making it easy to use.

In some embodiments, the bottom box-like structure 1 further includes a second curved edge 16.

The second curved edge 16 refers to a structure that projects upward in a vertical direction (e.g., the Z direction in FIG. 6) relative to the upper surface of the bottom box-like structure 1. In some embodiments, the second curved edge 16 is in the form of a plate. In some embodiments, the second curved edge 16 is provided at the top of the bottom box-like structure 1, and the second curved edge 16 is provided along a circumferential direction of the top of the bottom box-like structure 1. In some embodiments, the second arcuate edge 16 is disposed in a loop around the first curved edge 14.

In some embodiments, a third groove 141 is provided between the second curved edge 16 and the first curved edge 14. In some embodiments, at least a portion of the holding bag 2 snaps to the third groove 141. The third groove 141 is utilized to snap the holding bag 2, increasing the stability of the holding bag 2.

In some embodiments, the width of the inner surface of the second curved edge 16 along the width direction of the bottom box-like structure 1 (e.g., the X direction in FIG. 6) is greater than the width of the outer surface of the first curved edge 14 along the width direction (e.g., the X direction in FIG. 6). This increases the width of the third groove 141 and prevents the third groove 141 from clamping the holding bag 2, which makes the holding bag 2 susceptible to damage or difficult to detach.

In some embodiments, the holding box 3 for cat litter and waste and the second curved edge 16 are connected to the waste cover 32. For more on the waste cover 32, see the related description below. By eliminating the holding box, the cost of use is reduced.

In some embodiments, the holding bag 2 sleeves on the first curved edge 14 and the second curved edge 16. After the holding bag 2 is sleeved, the waste cover 32 is attached to the second curved edge 16, covering a portion of the holding bag 2. At least a portion of the waste cover 32 snaps into the third groove 141. An area corresponding to the second arcuate edge 16 serves as the excrement storage area 31B, and an area corresponding to the first curved edge 14 serves as the cat litter storage area 31A.

In some embodiments, the length of the second curved edge 16 along the length direction of the bottom box-like structure 1 (e.g., the Y direction in FIG. 6) is less than the length of the first curved edge 14 along the length direction of the bottom box-like structure 1 (e.g., the Y direction in FIG. 6). In some embodiments, the length of the second curved edge 16 along the extended degree direction (e.g., the Y direction in FIG. 6) is equal to the length of the waste cover 32 along the extended degree direction (e.g., the Y direction in FIG. 6), and the waste cover 32 just covers the excrement storage area 31B corresponding to the second curved edge 16, improving space utilization.

In some embodiments, the second curved edge 16 and the concave slot 15 are located at opposite ends of the first curved edge 14, respectively. For example, the ends along the length direction (e.g., the Y direction in FIG. 6).

In some embodiments, the waste cover 32 covers both the first curved edge 14 and the second curved edge 16.

In some embodiments, the X-direction, the Y-direction, and the Z-direction are perpendicular to each other, as shown in FIG. 6.

In some embodiments, the bottom box-like structure 1 is provided with a first step 17, and the first curved edge 14 and the second curved edge 16 are provided on the first step 17.

In some embodiments, the second curved edge 16 is disposed on the bottom box-like structure 1 on a side near where the waste cover 32 is disposed, and the waste cover 32 is disposed on the location near the second curved edge on a rounded transition surface, thereby preventing the holding bag 2 from being caught at the location of the waste cover 32.

The first step 17 is a step-like structure that projects upward in a vertical direction (e.g., the Z direction in FIG. 6) relative to the upper surface of the bottom box-like structure 1. In some embodiments, a downward projection of the first step 17 along a vertical direction (e.g., the Z direction in FIG. 6) falls within the coverage of the upper surface of the bottom box-like structure 1.

In some embodiments, the waste cover 32 is installed in conjunction with the first step 17. For example, the waste cover 32 is placed on the first step 17, with a lower surface of the waste cover 32 in contact with an upper surface of the first step 17. In some embodiments, after the waste cover 32 covers at least a portion of the bottom box-like structure 1, the concave slot 15 is disposed on an outer side of the waste cover 32.

The first step 17 is used to limit the location of the waste cover 32 in a vertical direction (e.g., the Z direction in FIG. 6) and to provide support for the waste cover 32, increasing the stability of the waste cover 32.

In some embodiments, the bottom box-like structure 1 is provided with a second step 18, and the first step 17 is provided on the second step 18.

The second step 18 is similar to the first step 17, and for more on the second step 18, see the previous section for more description of the first step 17.

In some embodiments, the downward projection of the first step 17 along a vertical direction (e.g., the Z direction in FIG. 6) falls within the coverage of the second step 18.

In some embodiments, a second step 18 is used to position the holding box 3 and/or the auto-cleaning litter box. In some embodiments, at least a portion of the first step 17, the first curved edge 14, and/or the second curved edge 16 extends into an interior of the holding box 3 for cat litter and waste and/or the auto-cleaning litter box, and the bottom surface of the holding box 3 for cat litter and waste and/or the auto-cleaning litter box is cooperatively connected to the second step 18.

Using the second step to improve the positioning accuracy of the holding box and/or the auto-cleaning litter box facilitates the ability of the holding box and/or the auto-cleaning litter box to be quickly aligned and mounted on the bottom box-like structure.

In some embodiments, as shown in FIG. 6, the holding box 3 and/or the waste cover 32 are provided with a second groove 33 that fits into the concave slot 15.

The second groove 33 refers to a groove used in conjunction with the concave slot 15. When the holding box 3 for cat litter and waste or the waste cover 32 is mounted on the bottom box-like structure 1, the concave slot 15 is located in the second groove 33. The drawstring 21 that snaps to the first groove 1151 protrudes from the second groove 33.

By providing a second groove, it is possible to prevent the holding box or the waste cover from being obstructed by the concave slot when it is installed.

In some embodiments, the lower surface of the holding bag 2 is adapted to the upper surface of the bottom box-like structure 1.

In some embodiments, the upper surface of the bottom box-like structure 1 includes an inner surface of the holding space, and the lower surface of the holding bag 2 is adapted to the inner surface of the holding space. In this way, at least a portion of the lower surface of the holding bag 2 is adapted to fit to the inner surface of the holding space, improving space utilization of the holding space. At the same time, avoiding a gap between the holding bag 2 and the bottom box-like structure 1 prevents the holding bag 2 from being pressed by the holding box 3 for cat litter and waste when the holding box 3 for cat litter and waste is placed into the holding bag 2.

In some embodiments, the lower surface of the holding box 3 for cat litter and waste is adapted to the upper surface of the holding bag 2.

In some embodiments, the upper surface of the holding bag 2 forms a second holding space, and the lower surface of the holding box 3 for cat litter and waste is adapted to fit the inner surface of the second holding space. In this way, the lower surface of the holding box 3 for cat litter and waste is adapted to fit on the upper surface of the holding bag 2, improving the space utilization of the second holding space.

In some embodiments, the corners of the holding box 3 for cat litter and waste have rounded transitions. This avoids forming sharp bumps on the outer surface of the holding box 3 for cat litter and waste to scratch the holding bag 2.

In some embodiments, a plurality of holding bags 2 are provided. The plurality of holding bags 2 are set in stacked layers along a vertical direction (e.g., the Z direction in FIG. 2). The lowermost holding bag 2 is provided in the holding space. The holding box 3 for cat litter and waste is provided within the uppermost holding bag 2. During use, the uppermost holding bag 2 is used in order along the vertical direction (e.g., the Z direction in FIG. 2) from top to bottom. This avoids frequent installations of the holding bag 2 by the user.

Figure 7:
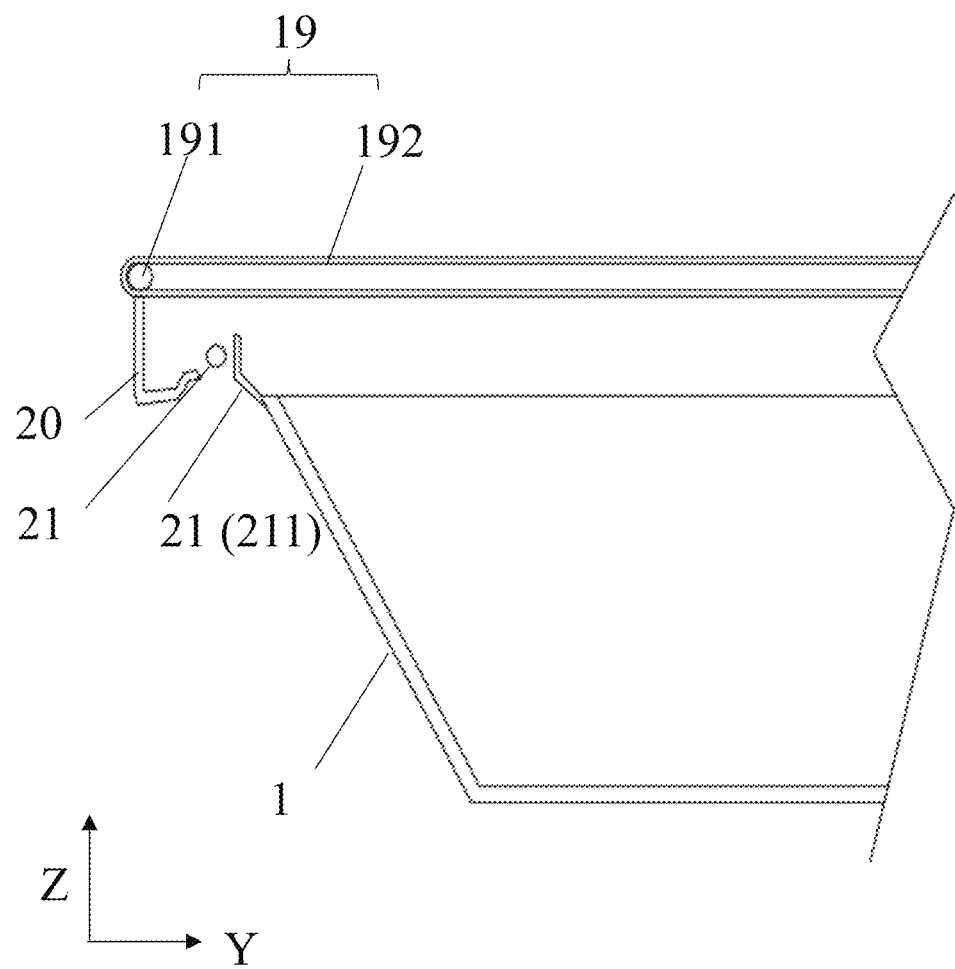
FIG. 7 is a schematic diagram of a structure of an automatic bag collecting device according to some embodiments of the present disclosure.
Figure 8:
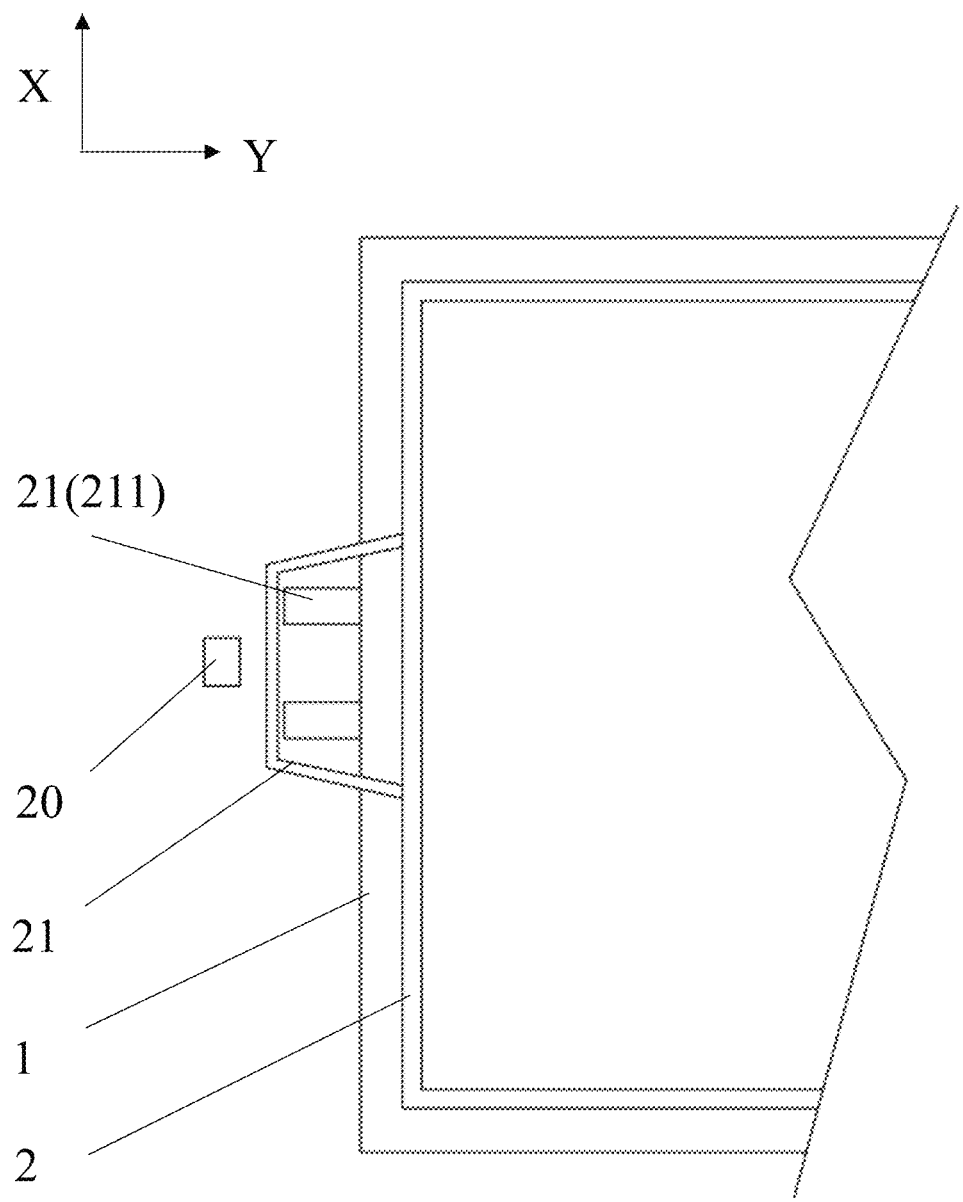
FIG. 8 is a top view of a fixing structure according to some embodiments of the present disclosure.

FIG. 7 is a schematic diagram of a structure of an automatic bag collecting device according to some embodiments of the present disclosure. FIG. 8 is a top view of a fixing structure according to some embodiments of the present disclosure.

As shown in FIG. 8, the bottom box-like structure type holding box for cat litter and waste includes an automatic bag collecting device.

The automatic bag collecting device refers to a device capable of automating the packing of holding bags. In some embodiments, the bottom box-like structure 1, when used in conjunction with the holding box 3 for cat litter and waste, has the automatic bag collecting device disposed under the holding box 3 for cat litter and waste or on top of the bottom box-like structure 1. In some embodiments, when the bottom box-like structure 1 is used in conjunction with the waste cover 32, the automatic bag collecting device is provided on top of the bottom box-like structure 1.

In some embodiments, the automatic bag collecting device includes a driving structure 19, a hook 20, and a fixing structure 23. Holding bags can be packed by the automatic bag collecting device include drawstring holding bags or the like.

In some embodiments, the hook 20 is L-shaped to facilitate hooking the drawstring 21. In some embodiments, a portion of the hook 20 in contact with the drawstring 21 is S-shaped, and a side of the hook 20 proximity to the drawstring 21 has a smaller angle to the horizontal plane (i.e., the X-Y plane), which facilitates hooking the drawstring 21; and after the drawstring 21 is hooked, the arcuate groove in the S-shape of the hook 20 prevents the drawstring 21 from disengaging.

The fixing structure refers to a structure for fixing the drawstring 21. In some embodiments, the fixing structure 23 is configured to fix the drawstring 21, for example, fix at least a portion of the drawstring 21 protruding out of the opening of the holding bag 2.

For more on the opening of the holding bag 2, see the related description in FIG. 5.

In some embodiments, the fixing structure 23 includes an L-shaped projection 231 disposed in the bottom box-like structure 1. In some embodiments, at least one side face of the L-shaped projection 231 is parallel to the vertical direction (e.g., the Z direction in FIG. 7), to which the drawstring 21 is connected. By adopting the L-shaped projection 231, it is possible to increase the effective area of the fixing structure 23 for connecting the drawstring 21 and prevent the drawstring 21 from falling off from the fixing structure 23.

In some embodiments, two L-shaped projections 231 are provided, and the driving structure 19 drives the hook 20 to pass between the two L-shaped projections 231, and the drawstring 21 is connected to the two L-shaped projections 231 respectively.

In some embodiments, a gap between the two L-shaped projections 231 is larger than a width of the hook 20, which helps to prevent the hook 20 from colliding with the L-shaped projections 231.

Setting two L-shaped projections can tension the drawstring, avoiding the drawstring from loosening, so as to improve the location accuracy of the drawstring, and can make the hook more precisely hooked to the drawstring when moving.

In some embodiments, the highest location of the fixing structure 23 exceeds the highest location of the bottom box-like structure 1, and the bottom of the hook 20 is located above the bottom box-like structure 1. In this way, during the movement of the hook 20, it is possible to avoid a collision between the hook 20 and the bottom box-like structure 1. In some embodiments, the highest location of the fixing structure 23 is flush with the highest location of the bottom box-like structure 1, or the highest location of the fixing structure 23 is lower than the highest location of the bottom box-like structure 1. The trajectory of the hook 20 is changed by altering the driving structure 19 (e.g., setting a fixed pulley to change the direction of movement of the conveyor belt, or, setting an up-and-down moving device 22), thereby avoiding the hook 20 colliding with the bottom box-like structure 1.

The driving structure 19 refers to a structure that may output force and/or torque. In some embodiments, the driving structure 19 is configured to drive the hook 20 to move and/or rotate to hook the drawstring 21. In some embodiments, the driving structure drives the hook 20 to move from outside to inside along the length direction of the bottom box-like structure 1 (e.g., the Y direction in FIG. 7).

In some embodiments, the driving structure 19 includes a conveyor belt 192, at least two conveyor wheels 191, and a motor (not shown in the figures).

The conveyor belt 192 is drivingly connected to the two conveyor wheels 191, and the motor drives at least one of the conveyor wheels 191 to rotate, thereby driving the conveyor belt 192. In some embodiments, the hook 20 is provided on the conveyor belt 192. When the conveyor belt 192 is rotated, it drives the hook 20 to move so that the hook 20 is able to hook onto the drawstring 21.

In some embodiments, the driving structure 19 includes other structures, for example, at least one of a cylinder, a hydraulic cylinder, an electric push cylinder, a rack-and-pinion drive chain, a spool, or the like.

After the holding device has been used, the user activates the driving structure 19 so that the driving structure 19 drives the hook 20 to move along the length direction of the bottom box-like structure 1 (e.g., the Y direction of FIG. 7) from outside to inside. The hook 20 is contact with the drawstring 21 during moving, thereby hooking the drawstring 21 and driving the drawstring 21 to move in synchronization. After being subjected to a pulling force, the drawstring 21 brings the openings of the holding bag 2 closer together, thereby packing the cat litter and the waste in the holding bag 2 together.

After the packing is completed, the drawstring 21 is removed from the hook 20, and the driving structure 19 drives the hook 20 to move to its original location from inside to outside.

Remote control is achieved through the use of the automatic bag collecting device, eliminating the need for the user to manually pack the bag, improving the efficiency of packing and avoiding the user from having to be close contact with cat excrement.

In some embodiments, two automatic bag collecting devices are provided, and fixing structures 23 corresponding to the two automatic bag collecting devices are provided on two opposite sides of the bottom box-like structure 1. The driving structures 19 corresponding to the two automatic bag collecting devices drive the two hooks 20 to move synchronously in opposite directions, respectively. The synchronized movement includes simultaneous movement of the two hooks 20 from outside to inside so as to simultaneously pull the opposite ends of the drawstring 21, which is conducive to improving the efficiency of packing. The synchronized movement also includes simultaneous movement of the two hooks 20 from inside to outside, so that the two hooks 20 are reset simultaneously.

Figure 9:
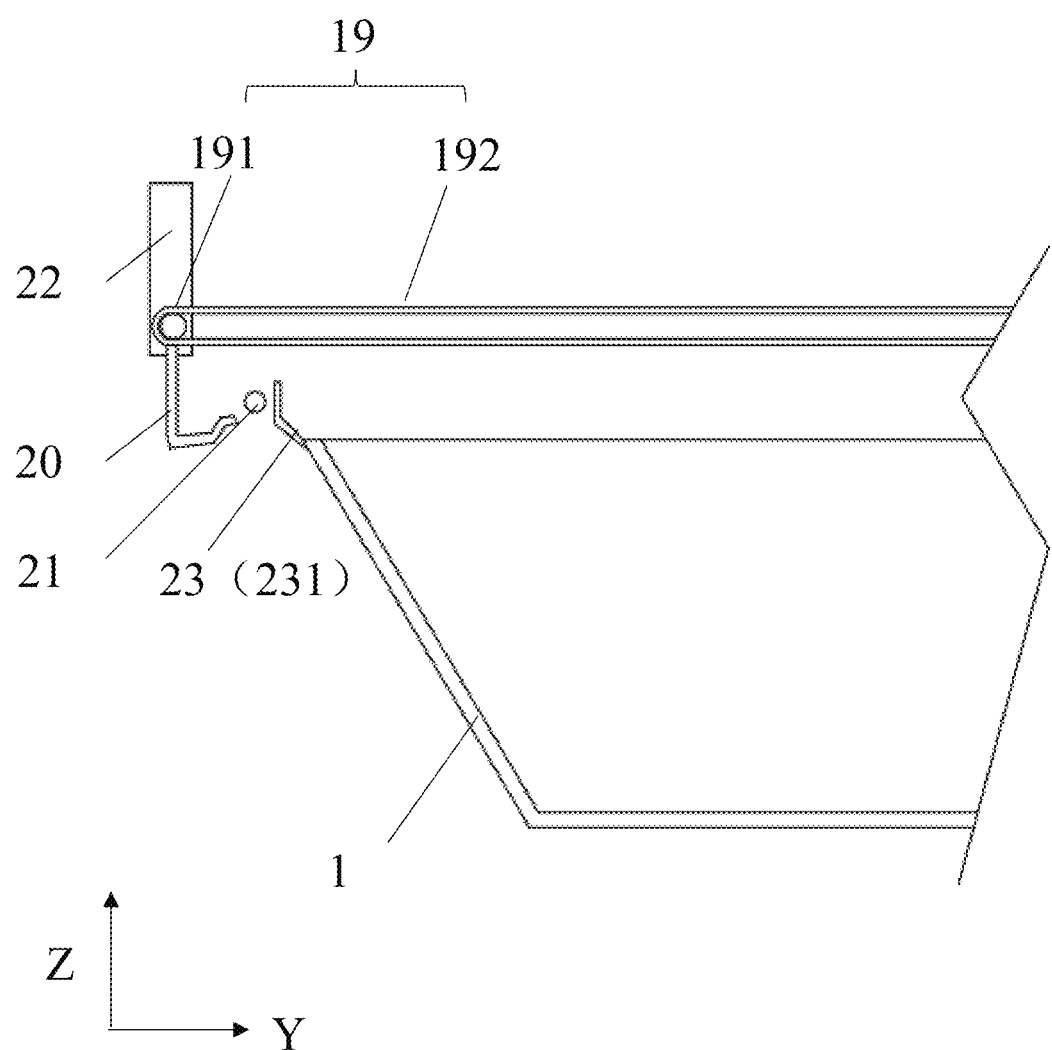
FIG. 9 is a schematic diagram of another structure of an automatic bag collecting device according to some embodiments of the present disclosure.

FIG. 9 is a schematic diagram of another structure of an automatic bag collecting device according to some embodiments of the present disclosure.

In some embodiments, as shown in FIG. 9, the automatic bag collecting device further includes the up-and-down moving device 22.

The up-and-down moving device 22 may output power along a vertical direction (e.g., the Z direction in FIG. 9). In some embodiments, the up and down moving device 22 drives the hook 20 to move in a vertical direction (e.g., the Z direction in FIG. 9). In some embodiments, the up-and-down moving device 22 drives the driving structure 19 and the hook 20 in an overall synchronized movement. For example, the up-and-down moving device 22 is drive-connected to at least two conveyor wheels 191, and when the up-and-down moving device 22 drives the at least two conveyor wheels 191, the at least two conveyor wheels 191, the conveyor belt 192, and hooks move synchronously.

In some embodiments, the up-and-down moving device 22 utilizes a plurality of structures, for example, at least one of a cylinder, a hydraulic cylinder, a rack-and-pinion drive chain, a belt drive chain, or the like.

When the driving structure 19 drives the hook 20 to hook the drawstring 21, the up-and-down moving device 22 drives the driving structure 19 and the hook 20 to move upward as a whole. In this process, the driving structure 19 also simultaneously drives the hook 20 inward.

During the process of the pulling of the drawstring 21, the portion of the drawstring 21 that extends out of the annular channel of the holding bag 2 gradually increase, and if the distance between the stress point of the drawstring 21 and the holding bag 2 does not change, this results in the slackening of the drawstring 21 and the failure to transfer the pulling force, making the packing of the holding bag 2 less effective. By adopting the up-and-down moving device 22, the distance between the stress point of the drawstring 21 and the holding bag 2 can be increased during the movement of the hook 20, so that the drawstring 21 is always in the state of tension, thereby ensuring the effect of packing the holding bag 2.

Figure 10:
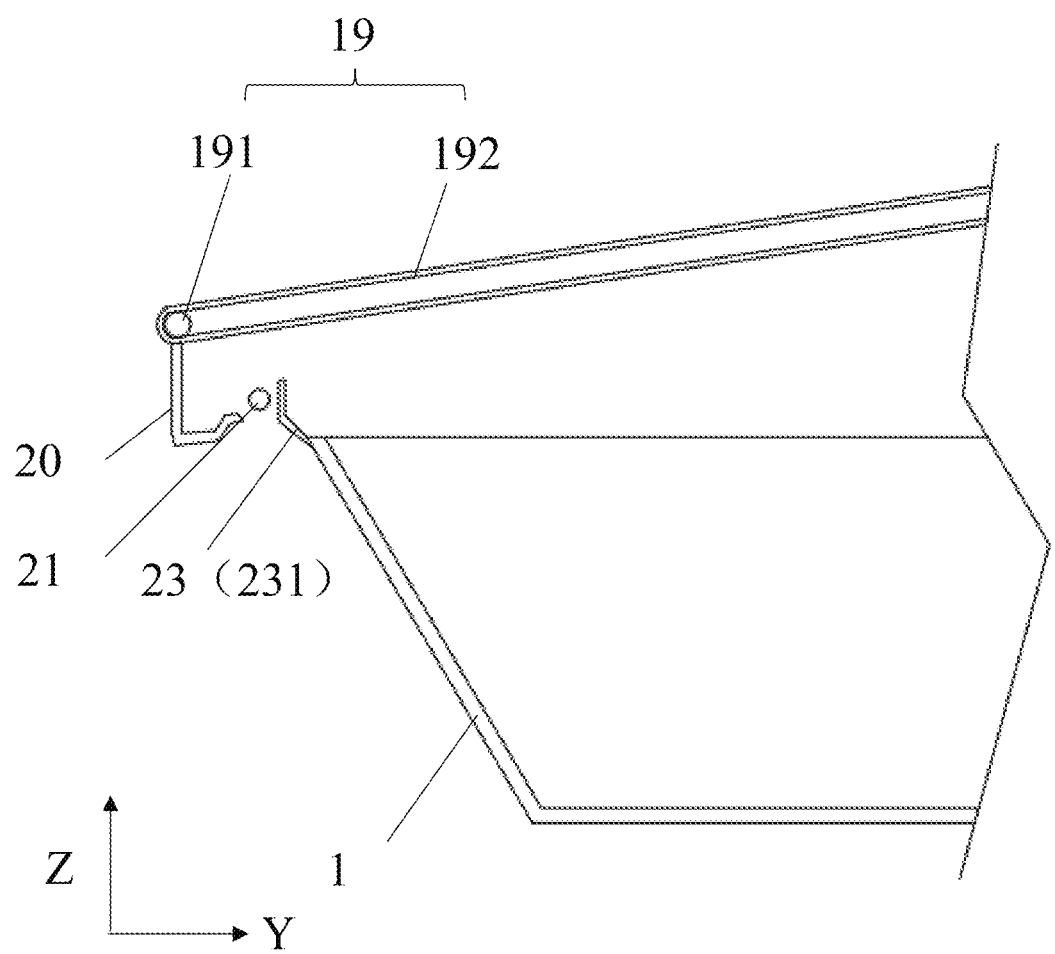
FIG. 10 is a schematic diagram of another structure of an automatic bag collecting device according to some embodiments of the present disclosure.

FIG. 10 is a schematic diagram of another structure of an automatic bag collecting device according to some embodiments of the present disclosure.

In some embodiments, as shown in FIG. 10, the hook 20 moves upward obliquely along a length direction of the bottom box-like structure 1 (e.g., the Y direction of FIG. 10), as well as the vertical direction (e.g., the Z direction of FIG. 10). In this way, during the movement of hook 20, it is also possible to increase a distance between the stress point of the drawstring 21 and the holding bag 2, so that the drawstring 21 is always kept in a state of tension, thus being able to ensure that the holding bag 2 is packed.

In some embodiments, the conveyor belt 192 of the driving structure 19 is provided inclinely, and when the conveyor belt 192 is rotated, it drives the hook 20 to move in the inclined direction.

In some embodiments, the holding box for cat litter and waste further includes a processor.

The processor may collect data and analyze and processing the data. The processor may generate control instructions based on the data and send the control instructions to an actuator to cause the actuator to perform the corresponding action or function. In some embodiments, the processor is communicatively connected to the driving structure of the automatic bag collecting device. The processor sends the control instructions to the driving structure to cause the driving structure to perform at least one of functions such as starting, shutting down, changing the moving speed of the hook.

In some embodiments, the processor is provided on the holding device.

In some embodiments, the processor is provided on the auto-cleaning litter box.

In some embodiments, the processor is set up on a remote server communicatively connected to the auto-cleaning litter box and the automatic bag collecting device. In some embodiments, the auto-cleaning litter box and the automatic bag collecting device include a WIFI module, with the WIFI module communicating with the remote server or the processor within the remote server via a wireless network. In some embodiments, the remote server includes a cloud server set up on the Internet, with the cloud server including a cloud server of a manufacturer corresponding to the auto-cleaning litter box. The remote server sends control instructions to the auto-cleaning litter box and the automatic bag collecting device over a wireless network.

In some embodiments, the auto-cleaning litter box and/or the automatic bag collecting device includes a bluetooth module, which is communicatively connected to a user terminal. The processor is provided on a user terminal, the user terminal includes an APP communicatively connected to the Bluetooth module, and the processor sends the control instructions to the auto-cleaning litter box and/or the automatic bag collecting device via the APP.

In some embodiments, the user terminal is communicatively connected to a remote server via the APP.

In some embodiments, the processor is configured to: obtain a model number of the holding bag; and determine a moving speed and a moving distance of the hook based on the model number of the holding bag.

The model number of the holding bag refers to data related to the standard and/or dimensions of the holding bag. In some embodiments, the model number of the holding bag includes at least one of an opening dimension, a thickness dimension, etc., of the holding bag. In some embodiments, the opening dimension of the drawstring holding bag includes a length dimension of the drawstring holding bag along a length direction of a base 11 (e.g., the Y direction in FIG. 7) after the drawstring holding bag is set.

In some embodiments, the processor obtains the model number of the drawstring holding bag in the plurality of ways. For example, the processor obtains the model number of the drawstring holding bag through user input, a vendor, or the like.

The moving speed is a speed of the hook when the driving structure drives the hook to move.

When the hook hooks on the drawstring, it exerts a pull force on the drawstring, which transmits the pull to the holding bag. The faster the moving speed of the hook, the more the tension applied to the holding bag. The larger the thickness dimension of the holding bag, the greater the tensile capacity of the holding bag. In some embodiments, the moving speed of the hook is positively correlated to the thickness dimension of the holding bag.

The moving distance is a distance of the hook relative to an initial location when the hook is drived by the driving structure. The initial location is a location where the hook is located before the movement. The initial location is preset. In some embodiments, the processor determines the initial location in the plurality of ways, for example, based on manual data, by obtaining from historical data, or the like.

After the hook hooks the drawstring and pulls the drawstring to move, the drawstring then gathers the opening(s) of the holding bag. The degree of gathering is positively correlated to the moving distance of the hook. As the dimension of the opening of the holding bag gets larger, the hook needs to move a greater distance for the opening(s) of the holding bag to be fully gathered. In some embodiments, the moving distance of the hook is positively correlated to the dimension of the opening of the drawstring holding bag.

In some embodiments, the processor confirms the moving speed and the moving distance of the hook in the plurality of ways, for example, by querying a comparison data table.

In some embodiments, the processor obtains the model number of the historical holding bag and the corresponding historical moving speed and historical moving distance from historical data, and constructs a comparison data table based on the model number of the historical holding bag and the corresponding historical moving speed and historical moving distance. The processor queries the comparison data table based on a model number of a current holding bag, selects a model number of a historical holding bag that is the same as the model number of the current holding bag, and sets a historical moving speed and a historical moving distance corresponding to the model number of the historical holding bag as the moving speed and the moving distance of the current hook.

In some embodiments, in response to a weight of waste reaching a predetermined packing weight, the processor controls the automatic bag collecting device to automatically pack the waste based on the moving speed and the moving distance, and sends a packing completion reminder to a user after packaging is completed.

The weight of waste is a weight of cat excrement. In some embodiments, the auto-cleaning litter box includes a weighing device. The weighing device is used to obtain the weight of waste. In some embodiments, the auto-cleaning litter box is communicatively connected to the processor, and the auto-cleaning litter box uploads the weight of waste obtained by the weighing device to the processor.

When the weight of waste reaches the predetermined packing weight, the processor controls the automatic bag collecting device to pack the holding bag. For example, the processor controls the activation of the driving structure of the automatic bag collecting device so that the driving structure drives the hook to hook the holding bag.

In some embodiments, the processor controls the automatic bag collecting device to automatically pack based on the moving speed and the moving distance. For example, the processor controls the actuation of the driving structure such that the driving structure drives hooks to move based on a determined moving speed until the moving distance of the hook satisfies a determined moving distance.

In some embodiments, the processor obtains the predetermined packing weight in the plurality of ways, for example, obtaining by manual input, from historical data, or the like.

In some embodiments, the processor controls the driving structure to activate based on a manually inputted packing operation to drive the hook to pack the holding bag. The manual input includes inputting via a button by the user.

The packing completion reminder refers to a reminder message for reminding that the holding bag has completed packed. In some embodiments, the packing completion reminder includes at least one of an audible reminder, a vibration reminder, a voice reminder, a text reminder, or the like.

In some embodiments, the processor sends the packing completion reminder to the user terminal. The user terminal includes at least one of a cell phone, a computer, or the like.

In some embodiments, the processor determines that the packing is complete in the plurality of ways. For example, an actual moving distance of the hook is equal to the afore-mentioned moving distance determined based on the model number of the holding bag. In some embodiments, the processor determines the actual moving distance of the hook in the plurality of ways, for example, obtaining via a distance sensor disposed on the automatic bag collecting device, etc.

In some embodiments of the present disclosure, by automatically determining the process of packing based on the model number of the holding bag, and intelligently controlling the automatic bag collecting device to pack and collect the holding bag based on the weight of waste, the degree of intelligence of the device is enhanced, which is greatly convenient for users to use and improves the user experience.

Some embodiments of the present disclosure provide a usage method of a holding device for cat litter and waste, including, setting a holding bag on a bottom box-like structure; placing a holding box for cat litter and waste in the holding bag; spreading cat litter in a cat litter storage area of the holding box for cat litter and waste; mounting an auto-cleaning litter box on the holding box for cat litter and waste; after use, removing the auto-cleaning litter box, lifting the holding bag, the holding bag carrying the holding box for cat litter and waste disengaging from the bottom box-like structure, discarding the holding bag, the holding box for cat litter and waste, and used cat litter and cat excrement in the holding box for cat litter and waste; and reinstalling a new holding bag and a new holding box for cat litter and waste on the bottom box-like structure, spreading with new cat litter, and reinstalling the auto-cleaning litter box.

Some embodiments of the present disclosure provide a usage method for a holding device for cat litter and waste, including: placing a holding bag under a holding box for cat litter and waste; spreading cat litter in a cat litter storage area of the holding box for cat litter and waste; mounting an auto-cleaning litter box on the holding box for cat litter and waste; after use, removing the auto-cleaning litter box, lifting the holding bag, the holding bag carrying the holding box for cat litter and waste, discarding the holding bag, the holding box for cat litter and waste, and used cat litter and cat excrement in the holding box for cat litter and waste; reinserting a set of anew holding bag and a new holding box for cat litter and waste, spreading new cat litter, and reinstalling the auto-cleaning litter box; or, placing a holding box for cat litter and waste on a floor or a platform; spreading cat litter in a cat litter storage area of the holding box for cat litter and waste; mounting an auto-cleaning litter box on the holding box for cat litter and waste; after use, removing the auto-cleaning litter box, discarding the used cat litter and cat excrement inside, and cleaning or replacing the holding box for cat litter and waste; and respreading the cat litter storage area with new cat litter and reinstalling the auto-cleaning litter box for continued use.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A holding device for cat litter and waste, comprising a bottom box-like structure and an automatic bag collecting device, wherein an upper end of the bottom box-like structure is provided with a holding bag, a holding box for cat litter and waste is provided above the holding bag, the holding box for cat litter and waste includes a bottom box and a waste cover, an interior of the bottom box is provided with a partition, an odor-resistant baffle is provided on a side wall of the waste cover, the bottom box-like structure includes a first curved edge and a concave slot, the first curved edge is set on a top of the bottom box-like structure, the concave slot is provided on at least one outer side face of the first curved edge, the automatic bag collecting device includes a driving structure, a hook, and a fixing structure, the fixing structure is provided on the bottom box-like structure, the fixing structure is configured to fix a drawstring, and the driving structure is configured to drive the hook to move or rotate to hook the drawstring.

2. The holding device for cat litter and waste according to claim 1, wherein the holding bag includes a drawstring plastic bag; a bottom of the holding bag is a sealing structure, and the drawstring is provided at an upper end of the holding bag.

3. The holding device for cat litter and waste according to claim 1, wherein the partition separates the bottom box into a cat litter storage area and an excrement storage area.

4. The holding device for cat litter and waste according to claim 1, wherein the odor-resistant baffle and the waste cover are of an integrally molded design, and the waste cover is provided with a positioning structure.

5. The holding device for cat litter and waste according to claim 4, wherein the positioning structure includes at least one galvanized iron sheet.

6. The holding device for cat litter and waste according to claim 1, wherein the bottom box-like structure is of an integrally molded design, and a bottom of the bottom box-like structure is provided with a concave-convex structure.

7. The holding device for cat litter and waste according to claim 6, wherein the bottom box-like structure is provided with air vents.

8. The holding device for cat litter and waste according to claim 1, wherein a middle of the waste cover is a raised structure.

9. The holding device for cat litter and waste according to claim 1, wherein inner and outer corners of the bottom box are rounded.

10. The holding device for cat litter and waste according to claim 1, wherein a cavity is disposed inside the waste cover, and an interior of the cavity is configured to hold a deodorizing material.

11. The holding device for cat litter and waste according to claim 1, wherein at least one of the holding box for cat litter and waste or the waste cover is provided with a structure matched with the concave slot.

12. The holding device for cat litter and waste according to claim 1, further including a processor; wherein
the processor is configured to:
obtain a model number of the holding bag;
determine a moving speed and a moving distance of the hook based on the model number of the holding bag; and
in response to a weight of waste reaching a predetermined packing weight, control the automatic bag collecting device to automatically pack the waste based on the moving speed and the moving distance, and send a packing completion reminder to a user after packaging is completed.

13. The holding device for cat litter and waste according to claim 1, wherein at least one ear is provided at an outer edge of the holding box for cat litter and waste.

14. A usage method of a holding device for cat litter and waste, comprising:
setting a holding bag on a bottom box-like structure; the bottom box-like structure includes a first curved edge, a concave slot, and an automatic bag collecting device, the first curved edge is set on a top of the bottom box-like structure, the concave slot is provided on at least one outer side face of the first curved edge, the automatic bag collecting device includes a driving structure, a hook and a fixing structure, the fixing structure is provided on the bottom box-like structure, the fixing structure is configured to fix a drawstring, and the driving structure is configured to drive the hook to move or rotate to hook the drawstring;
placing a holding box for cat litter and waste in the holding bag;
spreading cat litter in a cat litter storage area of the holding box for cat litter and waste;
mounting an auto-cleaning litter box on the holding box for cat litter and waste;
after use, removing the auto-cleaning litter box, lifting the holding bag, the holding bag carrying the holding box for cat litter and waste disengaging from the bottom box-like structure, discarding the holding bag, the holding box for cat litter and waste, and used cat litter and cat excrement in the holding box for cat litter and waste; and
reinstalling a new holding bag and a new holding box for cat litter and waste on the bottom box-like structure, spreading new cat litter, and reinstalling the auto-cleaning litter box.

* * * * *